(12) United States Patent
Kim et al.

(10) Patent No.: US 11,791,688 B2
(45) Date of Patent: *Oct. 17, 2023

(54) HOLLOW SHAFT MOTOR

(71) Applicant: BMC CO., LTD., Anseong-si (KR)

(72) Inventors: Ok Yun Kim, Seoul (KR); Kea Ho Lee, Gwangju (KR); Haeng Chul Sin, Gwangju (KR); Gwan Seon Jeong, Gwangju (KR)

(73) Assignee: BMC CO., LTD., Anseong-si (KR)

( * ) Notice: Subject to any disclaimer, the term of this patent is extended or adjusted under 35 U.S.C. 154(b) by 257 days.

This patent is subject to a terminal disclaimer.

(21) Appl. No.: 17/272,659

(22) PCT Filed: Aug. 9, 2019

(86) PCT No.: PCT/KR2019/010036
§ 371 (c)(1),
(2) Date: Mar. 2, 2021

(87) PCT Pub. No.: WO2020/080657
PCT Pub. Date: Apr. 23, 2020

(65) Prior Publication Data
US 2021/0194317 A1      Jun. 24, 2021

(30) Foreign Application Priority Data
Oct. 16, 2018  (KR) ........................ 10-2018-0123435

(51) Int. Cl.
*H02K 7/00* (2006.01)
*H02K 3/52* (2006.01)
(Continued)

(52) U.S. Cl.
CPC ............ *H02K 7/003* (2013.01); *H02K 3/522* (2013.01); *H02K 5/1732* (2013.01); *H02K 5/225* (2013.01);
(Continued)

(58) Field of Classification Search
CPC ...... H02K 7/003; H02K 3/522; H02K 5/1732; H02K 5/225; H02K 7/083; H02K 21/16; H02K 2203/09
(Continued)

(56) References Cited

U.S. PATENT DOCUMENTS

| 2013/0169074 A1 | 7/2013 | Hussain et al. |
| 2015/0288244 A1 | 10/2015 | Kim et al. |
| 2015/0375727 A1 | 12/2015 | Weh et al. |

FOREIGN PATENT DOCUMENTS

| DE | 2874282 | * | 5/2015 | ............. H02K 7/085 |
| JP | 2014-057456 A | | 3/2014 | |

(Continued)

OTHER PUBLICATIONS

Machine translation of KR 20160082053, Park Two.*
International Search Report for PCT/KR2019/010036 dated Nov. 20, 2019 from Korean Intellectual Property Office.

*Primary Examiner* — Terrance L Kenerly
(74) *Attorney, Agent, or Firm* — Revolution IP, PLLC

(57) ABSTRACT

The hollow shaft motor according to the present invention comprises: a housing 11 having a cylindrical shape; an upper cover 12 coupled to an upper portion of the housing 11; a lower cover 15 coupled to a lower portion of the housing 11; a stator assembly 20 located in the housing 11; and a rotor assembly 30 located in the stator assembly 20 to rotate, wherein the rotor assembly 30 comprises a hollow shaft 31, a rotor core 32 coupled to an outer circumference of the hollow shaft 31, and a plurality of magnets 33 attached to an outer circumference of the rotor core 32.

9 Claims, 6 Drawing Sheets

(51) Int. Cl.
  *H02K 5/173*  (2006.01)
  *H02K 5/22*  (2006.01)
  *H02K 7/08*  (2006.01)
  *H02K 21/16*  (2006.01)

(52) U.S. Cl.
  CPC ............ *H02K 7/083* (2013.01); *H02K 21/16* (2013.01); *H02K 2203/09* (2013.01)

(58) Field of Classification Search
  USPC .......................................................... 310/90
  See application file for complete search history.

(56) References Cited

FOREIGN PATENT DOCUMENTS

| | | | | |
|---|---|---|---|---|
| JP | WO2014167645 | * | 2/2017 | ......... H02K 2213/03 |
| KR | 10-1222675 B1 | | 1/2013 | |
| KR | 10-2014-0003674 A | | 1/2014 | |
| KR | 10-2015-0112246 A | | 10/2015 | |
| KR | 10-2016-0001681 A | | 1/2016 | |
| KR | 10-2016-0082053 A | | 7/2016 | |
| KR | 10-2017-0006535 A | | 1/2017 | |

* cited by examiner

[Fig. 1]
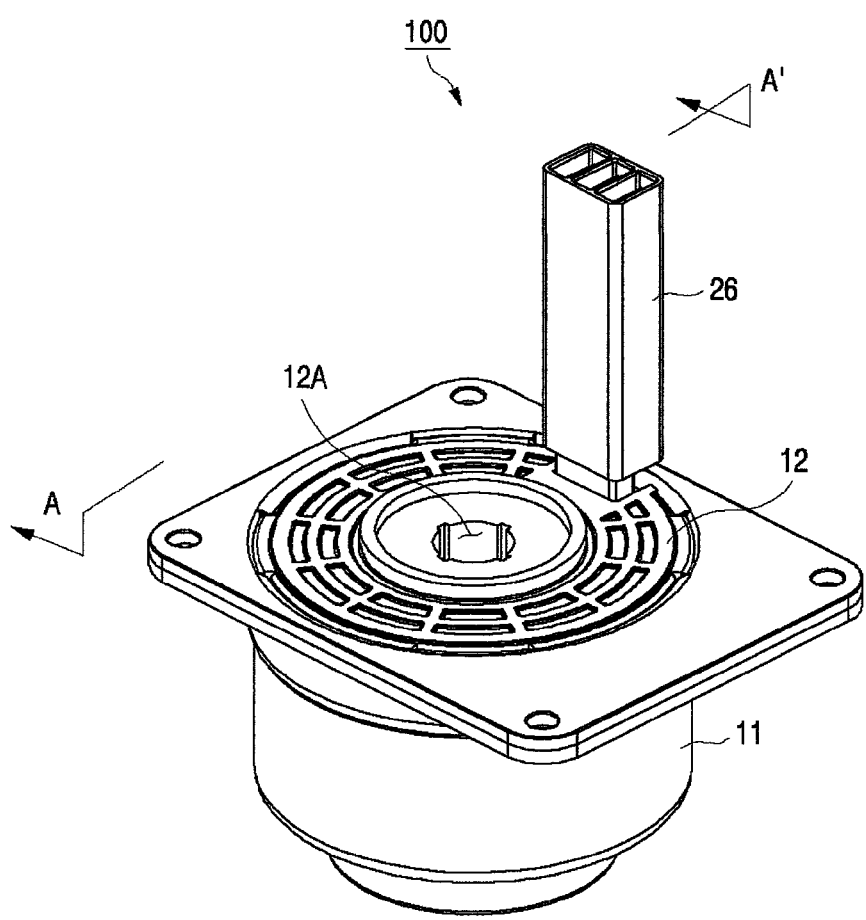

[Fig. 2]
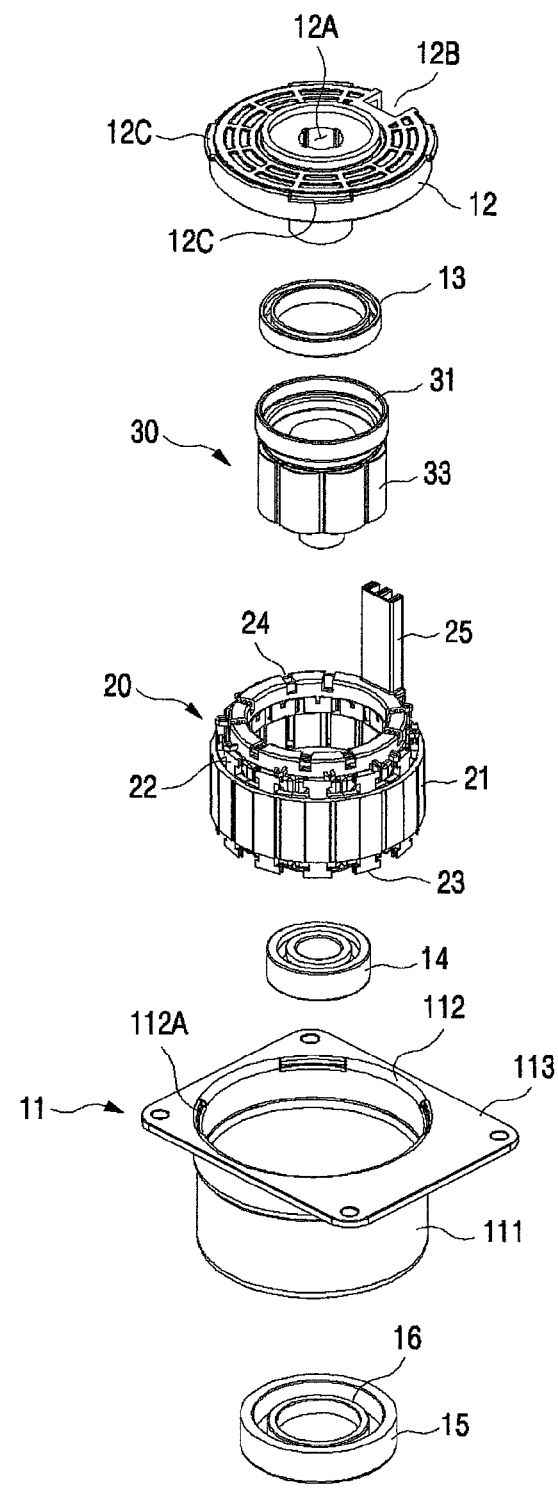

[Fig. 3]
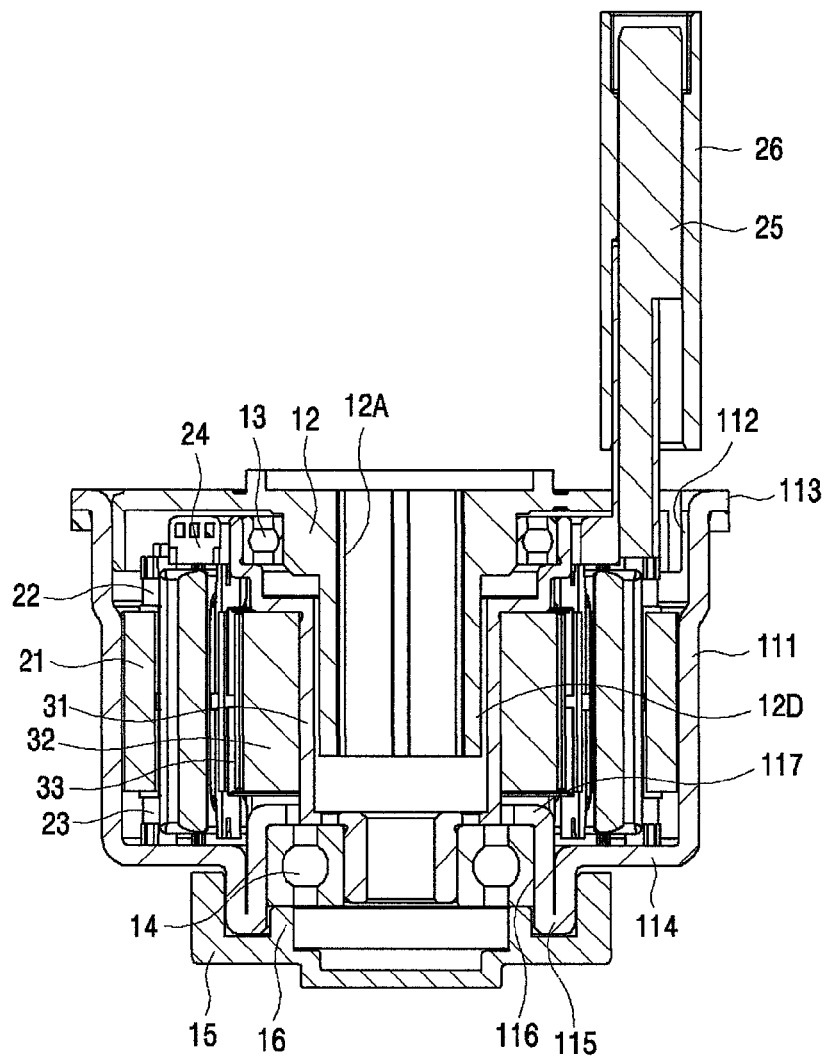

[Fig. 4]
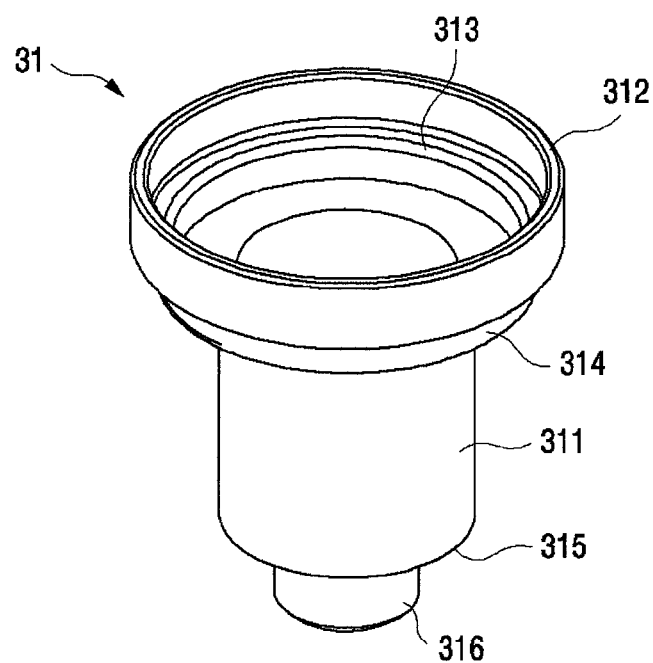

[Fig. 5]
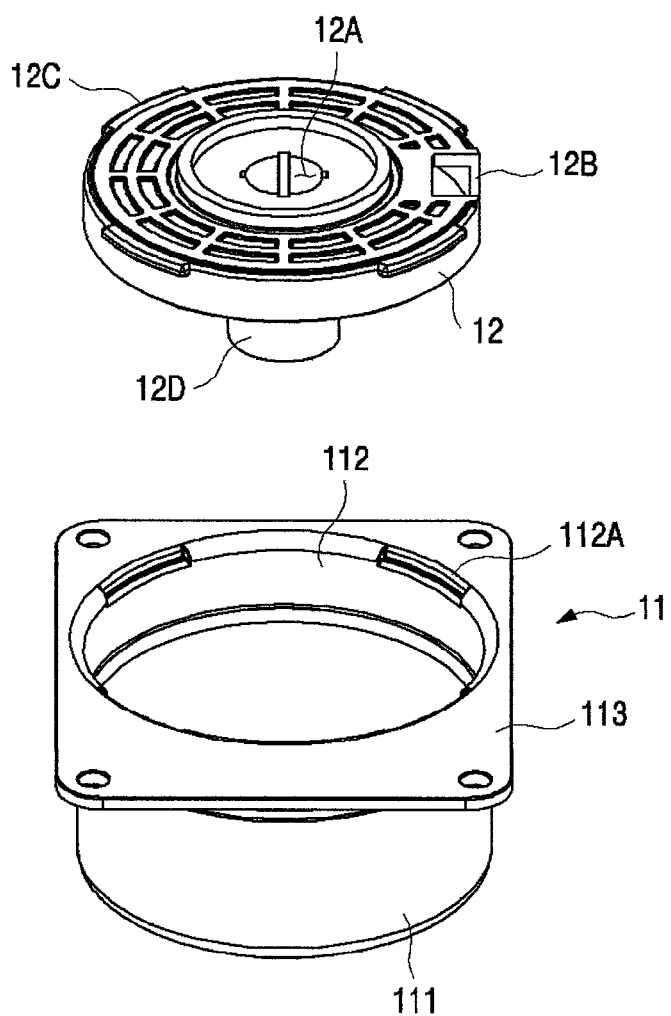

[Fig. 6]
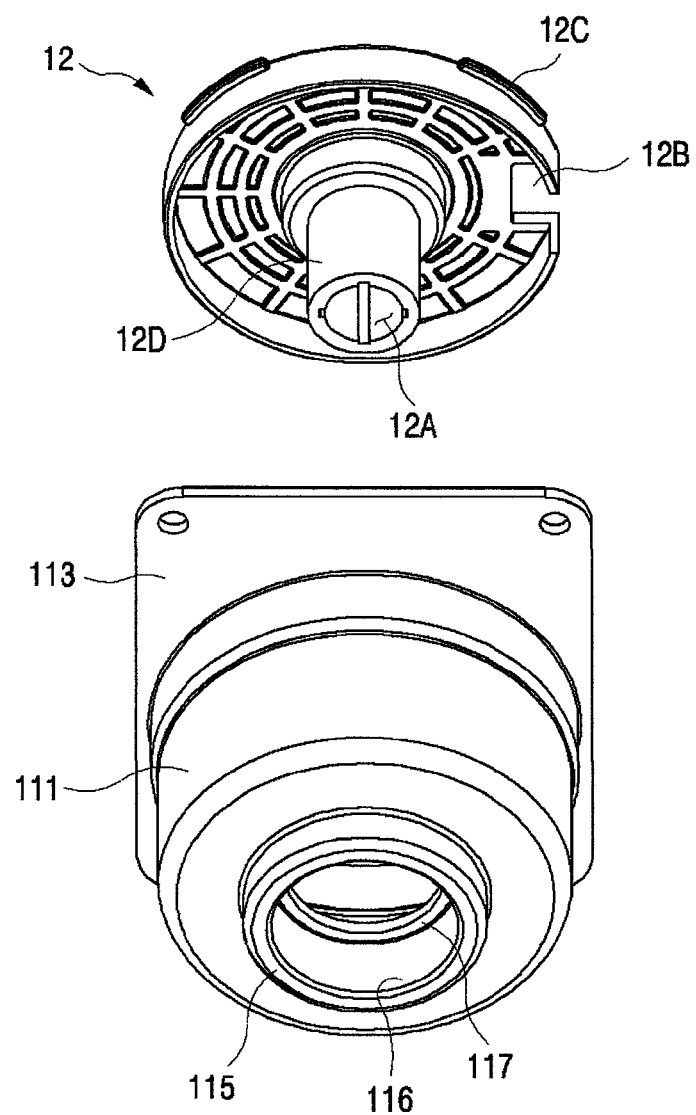

HOLLOW SHAFT MOTOR

TECHNICAL FIELD

The present invention relates to a motor. More specifically, the present invention relates to a motor adopting a hollow shaft having a bent shape and a novel housing structure to a hollow shaft motor used in an integrated brake system, which allows the production of a hollow shaft and a housing by a pressing process, thereby reducing manufacturing costs and improving assemblability and productivity.

BACKGROUND ART

In general, a brake system generates pressure in a master cylinder to amplify the force applied to a brake and provides the pressure to a module requiring braking. A hollow shaft motor is used as an apparatus for generating pressure in a master cylinder. Such hollow shaft motor rotates a hollow shaft by the principle of a motor, and applies a screw inside the hollow shaft to use the principle of converting rotary motion into linear motion. The linear motion of the screw actuates a piston to generate or remove the pressure required in the master cylinder.

Recently, an integrated dynamic brake (IDB) system mainly used a motor with a hollow shaft. Since the hollow shaft of the motor needs to generate high pressure by a screw and a piston operating in the hollow shaft, a considerable axial load is imposed on bearings supporting the hollow shaft. In this regard, four-point contact ball bearings may be used to support the rotation of the hollow shaft.

Korean Patent Laid-open No. 10-2016-0001681 discloses a motor having a structure that can manufacture a hollow shaft and a housing by a pressing process. Here, however, since the housing has the lower side closed, the assembling operation is difficult, and it is difficult to install a four-point contact ball bearing.

Korean Patent Laid-open No. 10-2017-0006535 discloses a structure of opening the lower side of a housing and assembling a separate cover thereto, and the technique of manufacturing a housing by a pressing process such as deep drawing. According to the structure, a separate cover is assembled to the lower side of the housing to support bearings supporting a hollow shaft, thereby supporting the load imposed on the hollow shaft. Thus, the assemblability and productivity decrease.

In order to solve the above-mentioned problems, the present inventors suggest a hollow shaft motor having a novel structure.

DISCLOSURE OF INVENTION

Technical Problem

It is an object of the present invention to provide a hollow shaft motor having a novel structure which allows the production of a hollow shaft and a housing by a pressing process, thereby reducing manufacturing costs and improving assemblability and productivity.

The object above and other objects inferred therein can be easily achieved by the present invention explained below.

Solution to Problem

The hollow shaft motor according to the present invention comprises: a housing 11 having a cylindrical shape; an upper cover 12 coupled to an upper portion of the housing 11; a lower cover 15 coupled to a lower portion of the housing 11; a stator assembly 20 located in the housing 11; and a rotor assembly 30 located in the stator assembly 20 to rotate, wherein the rotor assembly 30 comprises a hollow shaft 31, a rotor core 32 coupled to an outer circumference of the hollow shaft 31, and a plurality of magnets 33 attached to an outer circumference of the rotor core 32.

In the present invention, the hollow shaft 31 may comprise a yoke coupling part 311 having a cylindrical shape, an upper bearing support part 312 having a diameter greater than that of the yoke coupling part 311, an upper bearing receiving part 313 having a shape bent inwardly in a lower portion of the upper bearing support part 312, and a lower bearing support part 316 protruding downwardly from the yoke coupling part 311.

In the present invention, preferably, a lower sleeve 12D extending downwardly from a central portion of the upper cover 12 is formed, and the lower sleeve 12D extends inside the yoke coupling part 311.

In the present invention, preferably, an upper bearing 13 is coupled to an upper side of the lower sleeve 12D, and an outer race of the upper bearing 13 supports the rotation of the upper bearing support part 312.

In the present invention, preferably, a lower protruding part 115 protruding downwardly is formed in a lower central portion of the housing, a space in the center of the lower protruding part 115 forms a lower opening part 116, and a lower bearing receiving part 117 is formed such that the material of the lower protruding part 115 is bent to extend upwardly from a lower portion.

In the present invention, preferably, an upper portion of a lower bearing 14 is received in the lower bearing receiving part 117, an outer circumference of the lower bearing 14 is press-fitted into an inner side of the lower protruding part 115, and the lower bearing 14 supports the rotation of the hollow shaft 31.

In the present invention, the hollow shaft motor may further comprise a lower cover 15 coupled to an outer circumferential surface of the lower protruding part 115.

In the present invention, the hollow shaft motor may further comprise a stopper 16 inserted into a space between the lower bearing 14 and the lower cover 15 to support the axial load of the lower bearing 14.

In the present invention, the stopper 16 may be integrally formed with the lower cover 15.

Advantageous Effects of Invention

The present invention allows the production of a hollow shaft and a housing of a motor by a pressing process, thereby having the effects of reducing manufacturing costs and improving assemblability and productivity.

BRIEF DESCRIPTION OF DRAWINGS

FIG. 1 is a perspective view of a hollow shaft motor according to the present invention;

FIG. 2 is an exploded perspective view of a hollow shaft motor according to the present invention;

FIG. 3 is a cross-sectional view taken along the A-A' direction of FIG. 1;

FIG. 4 is a perspective view of a hollow shaft of the hollow shaft motor according to the present invention;

FIG. 5 is a top perspective view of an upper cover and a housing of the hollow shaft motor according to the present invention; and FIG. 6 is a bottom perspective view of an upper cover and a housing of the hollow shaft motor according to the present invention.

Hereinafter, the present invention will be explained in detail with reference to the accompanying drawings.

MODE FOR THE INVENTION

FIG. 1 is a perspective view of a hollow shaft motor 100 according to the present invention. FIG. 2 is an exploded perspective view of a hollow shaft motor 100 according to the present invention. FIG. 3 is a cross-sectional view taken along the A-A' direction of FIG. 1.

Referring to FIG. 1 to FIG. 3 together, the hollow shaft motor 100 according to the present invention includes a housing 11, a stator assembly 20 coupled to an inner side of the housing 11, and a rotor assembly 30 located in the stator assembly 20.

The housing 11 can be manufactured by a continuous process using a pressing equipment such as a transfer mold. The housing 11 has a body part 111 having a cylindrical shape whose upper portion and lower portion are open. The part that is open to the upper side of the housing 11 is an upper opening part 112, and a flange part 113 extending in the horizontal direction is formed around the upper opening part. An upper cover 12 is coupled to the upper opening part 112. The flange part 113 is coupled to a block (not illustrated) of a brake system. A bottom part 114 extending toward the center in the horizontal direction is formed in a lower portion of the body part 111, and a lower protruding part 115 protruding downwardly is formed in a central portion of the bottom part 114. A space in the center of the lower protruding part 115 forms a lower opening part 116. A lower bearing receiving part 117 is formed such that the material of the lower protruding part 115 is bent by a pressing process to extend upwardly from a lower portion.

The lower protruding part 115 has a structure wherein the material is bent and folded, to reinforce strength. Thus, when a great load is imposed on a lower bearing 14, the structure can help supporting the load. The lower bearing 14 is press-fitted and coupled to an inner surface of the lower protruding part 115, and an upper portion of the outer race of the lower bearing 14 is supported by the lower bearing receiving part 117. A lower end portion of the hollow shaft 31 is located in an opening space in the central portion of the lower bearing receiving part 117 and the lower opening part 116. The lower bearing receiving part 117 is preferably bent inwardly at a position higher than the bottom part 114 to extend. This leads to a structure allowing stable support of the lower bearing 14.

The upper cover 12 has a disk shape, and an outer circumferential portion thereof extends downwardly. The outer circumferential surface of the extending portion is press-fitted and coupled to an inner side of the upper opening part 112 of the housing 11. A piston (not illustrated) for moving up and down by the rotation of the hollow shaft 31 is located in a central space 12A formed in the central portion of the upper cover 12. A terminal space 12B is formed at one side of the upper cover 12 to connect a bus bar terminal 25 to an external power source. A plurality of coupling projections 12C protruding in the radial direction is formed in an upper portion of the upper cover 12. Coupling grooves 112A corresponding to the coupling projections 12C are formed around the upper opening part 112 of the housing 11 so that the coupling projections 12C are inserted and coupled to the coupling grooves 112A.

The central space 12A extends downwardly, and a lower sleeve 12D extending downwardly from the central portion of the upper cover 12 is formed to make the central space 12A. An upper bearing 13 is coupled to an upper side of the lower sleeve 12D. An outer race of the upper bearing 13 is supported by an upper portion of the hollow shaft 31 to support the rotation of the hollow shaft 31. The lower sleeve 12D extends downwardly in a central space of the hollow shaft 31. This structure separates the hollow shaft 31 and the central space 12A in the inner side of the lower sleeve 12D independently to some degree. Thereby, the piston (not illustrated) moving up and down can get an independent movement space.

A lower cover 15 is coupled to the lower protruding part 115 of the housing 11 to cover the lower opening part 116. The lower cover 15 may be press-fitted to an outer side of the lower protruding part 115 or screw-coupled by tapping. A stopper 16 is located in a space of the inner circumferential surface of the lower protruding part 115, and the stopper 16 is interposed between the lower bearing 14 and the lower cover 15 to have a structure of supporting the axial load imposed on the lower bearing 14. The stopper 16 may be a separate member from the lower cover 15 or be formed integrally with the lower cover 15 to be one member, not a separate member.

The stator assembly 20 comprises a stator core 21 press-fitted and fixed to an inner side of the body part 111 of the housing 11, an upper insulator 22 coupled to an upper portion of the stator core 21, and a lower insulator 23 coupled to a lower portion of the stator core 21. A coil (not illustrated) is wound around each insulator, and the coil is electrically connected to a bus bar (not illustrated) of a bus bar housing 24 coupled to an upper portion of the upper insulator 22. The bus bar is electrically connected to a bus bar terminal 25 to supply power from an external power source. The bus bar terminal 25 is surrounded and protected by a terminal cover 26.

The rotor assembly 30 is located in the stator assembly 20 to rotate. To this end, the rotor assembly 30 comprises a hollow shaft 31, a rotor core 32 coupled to an outer circumference of the hollow shaft 31, and a plurality of magnets 33 attached to an outer circumference of the rotor core 32. The detailed structure of the hollow shaft 31 is explained with reference to FIG. 4.

FIG. 4 is a perspective view of a hollow shaft 31 of the hollow shaft motor 100 according to the present invention. As illustrated in FIG. 3 and FIG. 4, the hollow shaft 31 of the present invention has a yoke coupling part 311 having a cylindrical shape. A rotor core 32 is coupled to an outer circumferential surface of the yoke coupling part 311. A plurality of magnets 33 is attached to an outer circumferential surface of the rotor core 32. The rotor core 32 may be omitted, and the plurality of magnets 33 may be attached directly to the outer circumferential surface of the yoke coupling part 311, if necessary.

An upper bearing support part 312 having a diameter greater than that of the yoke coupling part 311 is formed in an upper portion of the yoke coupling part 311. An outer race of the upper bearing 13 supports the rotation of the upper bearing support part 312. An upper bearing receiving part 313 having a shape bent inwardly is formed in a lower portion of the upper bearing support part 312. Further, a first reduced diameter part 314 extends downwardly from the upper bearing receiving part 313 and is bent for connection such that the diameter thereof is reduced to the diameter of the yoke coupling part 311. A second reduced diameter part 315 is bent from a lower portion of the yoke coupling part 311 for connection such that the diameter thereof is reduced. A lower bearing support part 316 protruding downwardly from the second reduced diameter part 315 is formed in a lower portion of the yoke coupling part 311. The rotation of the lower bearing support part 316 is supported by the lower bearing 14.

FIG. 5 is a top perspective view of a housing 11 and an upper cover 12 of the hollow shaft motor according to the present invention. FIG. 6 is a bottom perspective view thereof.

Referring to FIG. 5 and FIG. 6 together, the upper cover 12 is coupled to the upper opening part 112 of the housing 11 of the present invention. An outer circumferential surface of the upper cover 12 is press-fitted and coupled to an inner circumferential surface of the upper opening part 112, and the plurality of coupling projections 12C formed in the upper cover 12 is inserted and coupled to the coupling grooves 112A formed around the upper opening part 112 of the housing 11. A terminal space through which the bus bar terminal 25 passes and to which the terminal cover 26 is coupled is formed at one side of the upper cover 12. The lower sleeve 12D of the upper cover 12 extends downwardly such that a ball screw and a nut (not illustrated) for operating a piston up and down are located in the central space 12A therein. The lower sleeve 12D extends inside the yoke coupling part 311 of the hollow shaft 31 to separate the space where a ball screw, etc. is located, in the hollow shaft 31.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A hollow shaft motor, comprising:
   a housing (11) having a cylindrical shape;
   an upper cover (12) coupled to an upper portion of the housing (11);
   a lower cover (15) coupled to a lower portion of the housing (11);
   a stator assembly (20) located in the housing (11);
   a rotor assembly (30) located in the stator assembly (20) to rotate, wherein the rotor assembly (30) comprises a hollow shaft (31), a rotor core (32) coupled to an outer circumference of the hollow shaft (31), and a plurality of magnets (33) attached to an outer circumference of the rotor core (32); and
   a lower bearing (14) located in the housing (11),
   wherein the housing (11) has a lower protruding part (115) being formed with bent and folded to reinforce strength by a pressing process, wherein a bent portion of the lower protruding part (115) is folded by directly contacting with each other,
   wherein the lower bearing (14) is supported by a support structure including a stopper (16) and a lower bearing receiving part (117), the stopper (16) located in the lower protruding part (115) and the lower bearing receiving part (117) formed such that a material of the lower protruding part (115) is bent by the pressing process to extend upwardly from a lower portion of the lower protruding part (115),
   wherein the lower protruding part (115) is located in a space formed between an outer circumferential surface of the stopper (16) and in inner circumferential surface of the lower cover (15),
   wherein the stopper (16) supports a lower surface of lower bearing (14) and is coupled to an inner circumferential surface of the lower protruding part (115).

2. The hollow shaft motor of claim 1, wherein the hollow shaft (31) comprises a yoke coupling part (311) having a cylindrical shape, an upper bearing support part (312) having a diameter greater than that of the yoke coupling part (311), an upper bearing receiving part (313) having a shape bent inwardly in a lower portion of the upper bearing support part (312), and a lower bearing support part (316) protruding downwardly from the yoke coupling part (311).

3. The hollow shaft motor of claim 2, wherein a lower sleeve (12D) extending downwardly from a central portion of the upper cover (12) is formed, and the lower sleeve (12D) extends inside the yoke coupling part (311).

4. The hollow shaft motor of claim 3, wherein an upper bearing (13) is coupled to an upper side of the lower sleeve (12D), and an outer race of the upper bearing (13) supports the rotation of the upper bearing support part (312).

5. The hollow shaft motor of claim 1, wherein the lower protruding part (115) protruding downwardly is formed in a lower central portion of the housing, a space in the center of the lower protruding part (115) forms a lower opening part (116).

6. The hollow shaft motor of claim 5, wherein an upper portion of the lower bearing (14) is received in the lower bearing receiving part (117), an outer circumference of the lower bearing (14) is press-fitted into an inner side of the lower protruding part (115), and the lower bearing (14) supports the rotation of the hollow shaft (31).

7. The hollow shaft motor of claim 6, further comprising a lower cover (15) coupled to an outer circumferential surface of the lower protruding part (115).

8. The hollow shaft motor of claim 7, wherein the stopper (16) is inserted into a space between the lower bearing (14) and the lower cover (15) to support the axial load of the lower bearing (14).

9. The hollow shaft motor of claim 8, wherein the stopper (16) is integrally formed with the lower cover (15).

* * * * *